(12) United States Patent
Hu et al.

(10) Patent No.: US 8,094,273 B2
(45) Date of Patent: Jan. 10, 2012

(54) COLOR FILTER WITH DIFFERENT ALIGNMENT STRUCTURES AND DISPLAY PANEL USING THE SAME

(75) Inventors: Chih-Jen Hu, Hsin-Chu (TW); Meng-Chang Tsai, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 448 days.

(21) Appl. No.: 12/328,053

(22) Filed: Dec. 4, 2008

(65) Prior Publication Data

US 2009/0147190 A1   Jun. 11, 2009

(30) Foreign Application Priority Data

Dec. 5, 2007 (TW) ............................... 96146319 A

(51) Int. Cl.
*G02F 1/1337* (2006.01)
*G02F 1/1343* (2006.01)
(52) U.S. Cl. ................... 349/129; 349/142; 349/143
(58) Field of Classification Search ............... 349/129
See application file for complete search history.

(56) References Cited

U.S. PATENT DOCUMENTS

| | | | |
|---|---|---|---|
| 6,891,586 B2 | 5/2005 | Anno et al. | |
| 6,924,816 B2 | 8/2005 | Deering | |
| 7,139,052 B2 * | 11/2006 | Maeda | 349/114 |
| 7,259,816 B2 * | 8/2007 | Higa | 349/114 |
| 7,295,192 B2 | 11/2007 | Hu | |
| 2002/0001058 A1 | 1/2002 | Wang | |
| 2002/0149598 A1 | 10/2002 | Greier et al. | |
| 2003/0090581 A1 | 5/2003 | Credelle et al. | |
| 2003/0227429 A1 | 12/2003 | Shimoshikiryo | |
| 2004/0150768 A1 | 8/2004 | Shimizu et al. | |
| 2004/0263738 A1 | 12/2004 | Jin | |
| 2005/0162594 A1 | 7/2005 | Sasabayashi | |
| 2006/0001634 A1 | 1/2006 | Lee et al. | |
| 2006/0007384 A1 | 1/2006 | Kurasawa | |
| 2006/0050209 A1* | 3/2006 | Higa | 349/114 |
| 2006/0132684 A1 | 6/2006 | Tanaka | |
| 2007/0076158 A1 | 4/2007 | Jung et al. | |
| 2007/0132927 A1* | 6/2007 | Tsuchiya | 349/117 |
| 2007/0177081 A1* | 8/2007 | Tanaka et al. | 349/114 |

(Continued)

FOREIGN PATENT DOCUMENTS

CN        1595240         3/2005

(Continued)

OTHER PUBLICATIONS

Chinese language office action dated Feb. 13, 2009.

(Continued)

*Primary Examiner* — Wen-Ying P Chen
(74) *Attorney, Agent, or Firm* — Thomas, Kayden, Horstemeyer & Risley, LLP

(57) ABSTRACT

A display panel and a color filter substrate thereof are provided. The display panel includes a first substrate, an alignment structure set, a second substrate, a pixel electrode, and a liquid crystal layer. The alignment structure set includes a first and a second alignment units disposed on the upper electrode. The first alignment unit is different from the second alignment unit. The pixel electrode is formed on the second substrate and includes a first electrode and a second lower electrode opposite to the first and second alignment units, respectively. A color filter may be disposed between the first substrate and the alignment structure layer to form a color filter substrate.

17 Claims, 12 Drawing Sheets

U.S. PATENT DOCUMENTS

2007/0195246 A1  8/2007  Huang

FOREIGN PATENT DOCUMENTS

| | | |
|---|---|---|
| CN | 1877430 | 12/2006 |
| CN | 1945407 | 4/2007 |
| TW | 1276869 | 3/2007 |
| TW | 1282466 | 6/2007 |

OTHER PUBLICATIONS

Chinese language office action dated May 8, 2009.
English language translation of abstract of CN 1877430.
English language translation of abstract of TW 092132073.
English translation of pertinent parts of TW 1282466.
Taiwan Office Action dated Oct. 20, 2011.

* cited by examiner

COLOR FILTER WITH DIFFERENT ALIGNMENT STRUCTURES AND DISPLAY PANEL USING THE SAME

This application claims benefit to a Taiwanese patent application No. 096146319, filed on Dec. 5, 2007.

BACKGROUND OF THE INVENTION

1. Field of the Invention

The present invention relates to a color filter substrate and a display panel using the same. Particularly, the present invention relates to a color filter substrate and a display panel having different liquid crystal alignment structures.

2. Description of the Prior Art

Following improvement of technology, all of the standards of liquid crystal display (LCD) device also step forward to a new level. When consumers survey LCD devices, several elements including luminosity, reaction time, input/output interface, resolution, color gamut and viewable angle of the display panel always come into their mind. As for the viewable angle, due to physical nature of liquid crystal molecule of traditional LCD display panel, when viewers see the monitor from lateral sides of the display device instead of seeing the monitor from front side, the quality and the color of the output image is usually worse than that of the image from the front side.

In order to compensate this disadvantage, current LCD devices use a technology which simultaneously drives liquid crystal molecules in different ways by using two electrodes having different surface areas in the same pixel. As shown in FIG. 1, LCD device includes a first substrate 10 and a second substrate 20. The pixel electrode layer 50 is disposed on the second substrate 20. In each of the pixel, pixel electrode layer 50 includes a first electrode 51 and a second electrode 52. A common electrode layer 30 is disposed on the first substrate while the liquid crystal molecules 70 are filled into a space between common electrode layer 30 and pixel electrode layer 50.

An alignment structure 31 is disposed on the common electrode layer 30. Every alignment structure 31 protrudes toward the first electrode 51 or the second electrode 52. Through the alignment structure 31, the voltage difference between the pixel electrode layer 50 and the common electrode layer 30 drives the liquid crystal molecule 70 to twist different angles. Besides, because the surface areas of the first electrode 51 and the second electrode 52 are different, the twisting angles of the liquid crystal molecules 70 above both of the electrodes are different. In other words, in the same pixel, the liquid crystal molecules 70 are divided into two groups having different twisting angles. By this design, the quality and color of output image could be improved when viewers watch the monitor the lateral sides.

However, this design causes the decrease of the transparent area and the aperture ratio, since two or plural the same alignment structures are used. Even further, the decrease reduces the luminosity of whole panel and causes unequal luminosity between the first electrode 51 and the second electrode 52.

SUMMARY OF THE INVENTION

It is an object of the present invention to provide a color filter substrate and a display panel having thereof so as to improve image luminosity.

It is another object of the present invention to provide a color filter substrate and a display panel having thereof so as to progress aperture ratio.

It is a further object of the present invention to provide a color filter substrate and a display panel having thereof so as to be able to flexibly adjust twisting angle of liquid crystal molecule.

The display panel includes a first substrate, an upper electrode, an alignment structure set, a second substrate, a pixel electrode and a liquid crystal layer. The first substrate is disposed corresponding to the second substrate. The alignment structure set, the pixel electrode and liquid crystal layer would be accommodated between the first substrate and the second substrate. The alignment structure set includes a first alignment unit and a second alignment unit. The upper electrode is disposed on one surface of the first substrate corresponding to the second substrate. The first alignment unit and the second alignment unit are formed on the upper electrode, respectively. These alignment units could be shaped in cone, cavity or other structure having the same function. The first alignment unit is distinct from the second alignment unit. For instance, both of the alignment units are different among several factors including volume, angle, structure, basic shape and so on.

The pixel electrode is formed on the second substrate and includes first lower electrode and second lower electrode, which series connects to each other. The distributing place of the first lower electrode is corresponding to the first alignment unit. In this case, the distributing place of the second lower electrode is corresponding to the second alignment unit. Liquid crystal layer is accommodated between the upper electrode and pixel electrode. By adjusting the potential difference between the upper electrode and the pixel electrode, the twisting angle of the liquid crystal molecules could also be adjusted. Because the surface areas of the first lower electrode and the second lower electrode of the pixel electrode are different, the twisting angles of the liquid crystal molecules, respectively, above the first lower electrode and the second lower electrode would be different. Furthermore, the structural difference between the first alignment unit and the second alignment unit also affects the twisting angle of the liquid crystal molecules. That also improves the aperture ratio of the display panel to enhance image luminosity.

A color filter layer is disposed on the first substrate to form the first substrate as color filter substrate. The color filter layer is accommodated between the first substrate and alignment structure set. The color filter layer includes at least one color unit. When the color unit is disposed on the first lower electrode and the second lower electrode, the color unit is disposed corresponding to the first alignment unit and the second alignment unit. When light emits from the liquid crystal layer toward the color filter layer, the color unit can filter partial beams to allow the specific wave length beams to penetrate.

DETAILED DESCRIPTION OF THE PREFERRED EMBODIMENT

The present invention provides a color filter substrate and a display panel having thereof. In the embodiment, the display panel includes a liquid crystal display panel. The liquid crystal display (LCD) panel preferably includes transmissive LCD panel, reflective LCD panel, transflective LCD panel and other types of LCD panel. Besides, in this embodiment, color filter substrate is a substrate disposed on a displaying side of the display panel. However, in other embodiment, color filter substrate can be a substrate disposed close to non-displaying side of the display panel.

Figure 1:
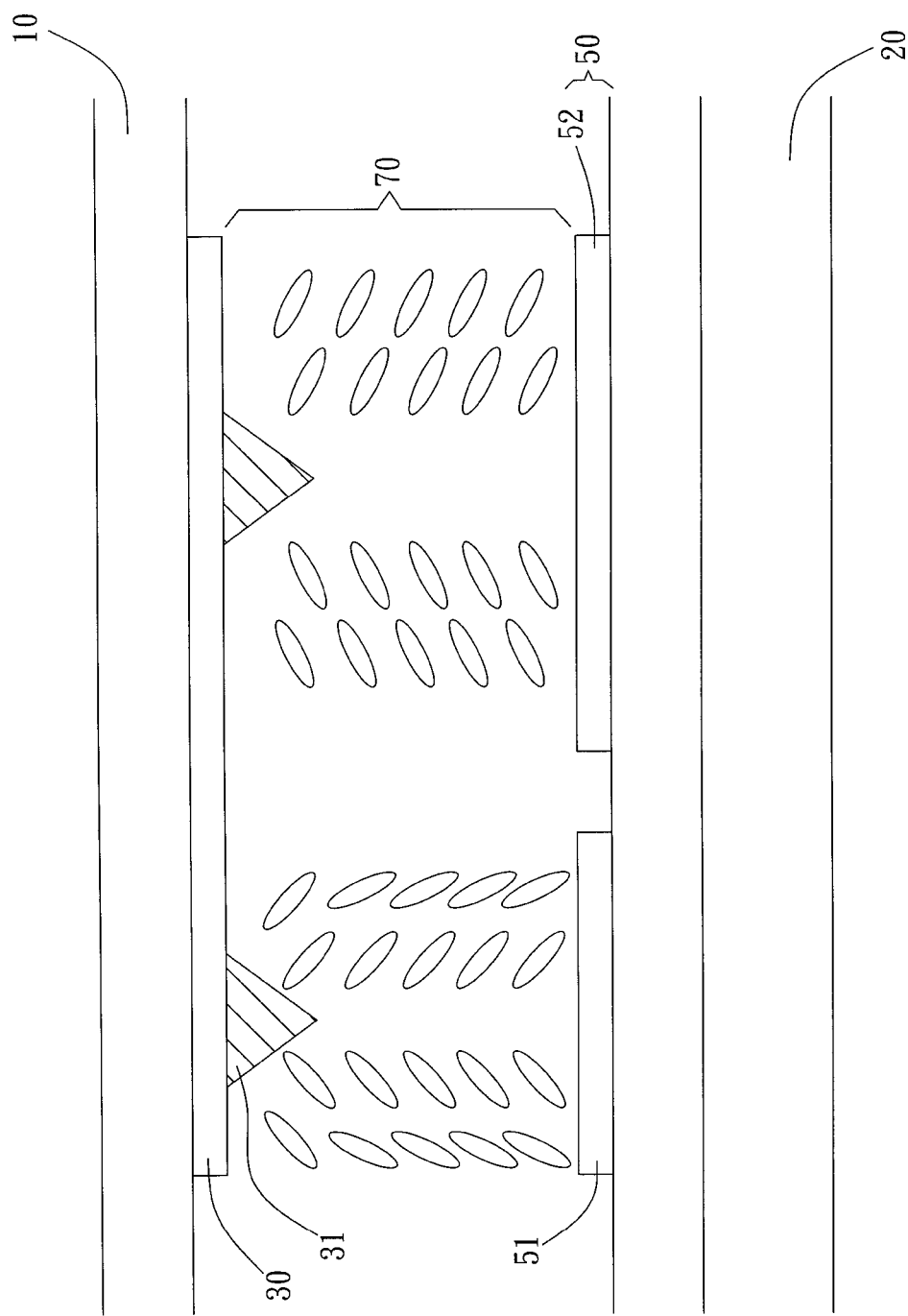
FIG. 1 shows a side view of a traditional display panel.
Figure 2A:
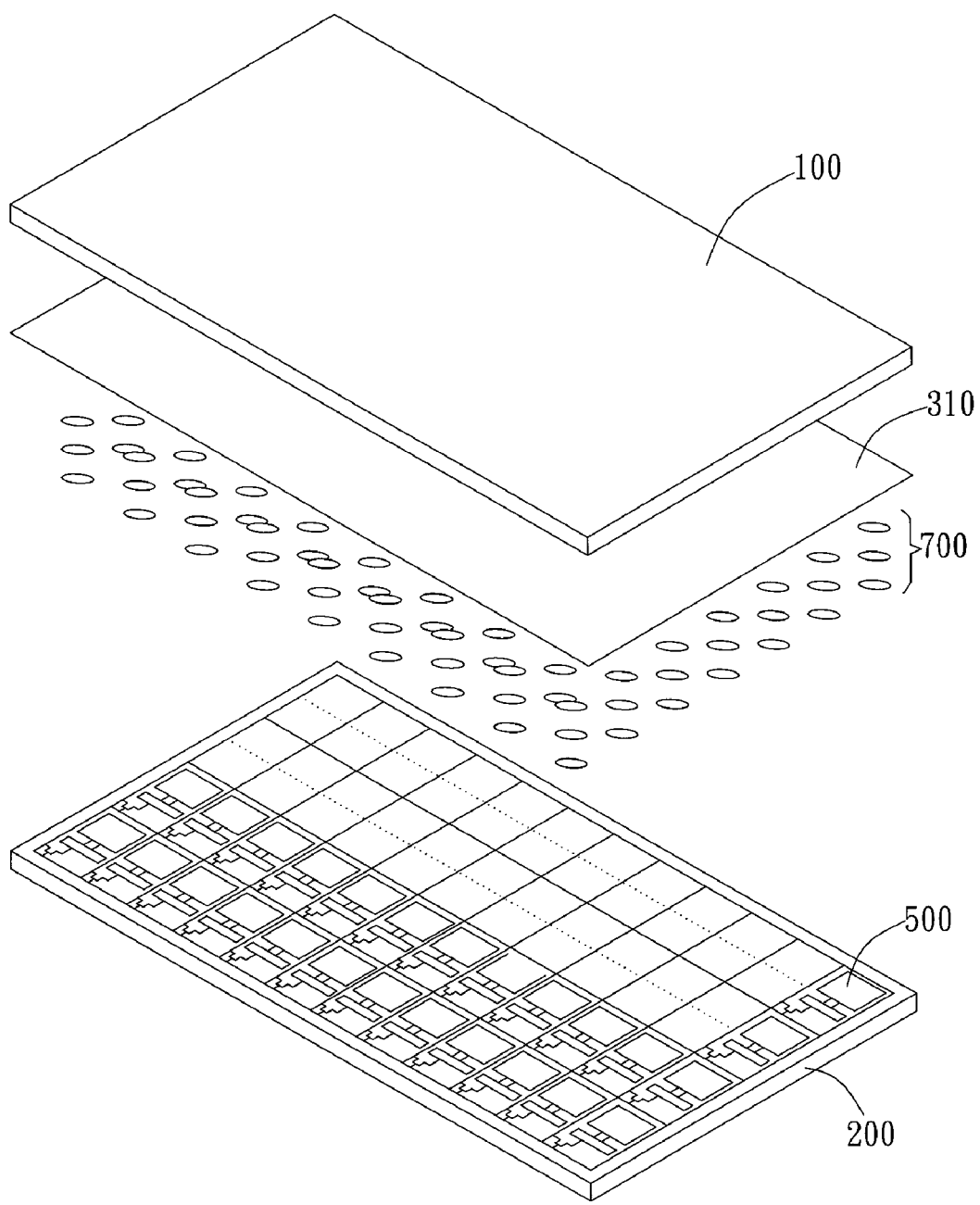
FIG. 2a shows an explosive view of the embodiment of the display panel.
Figure 2B:
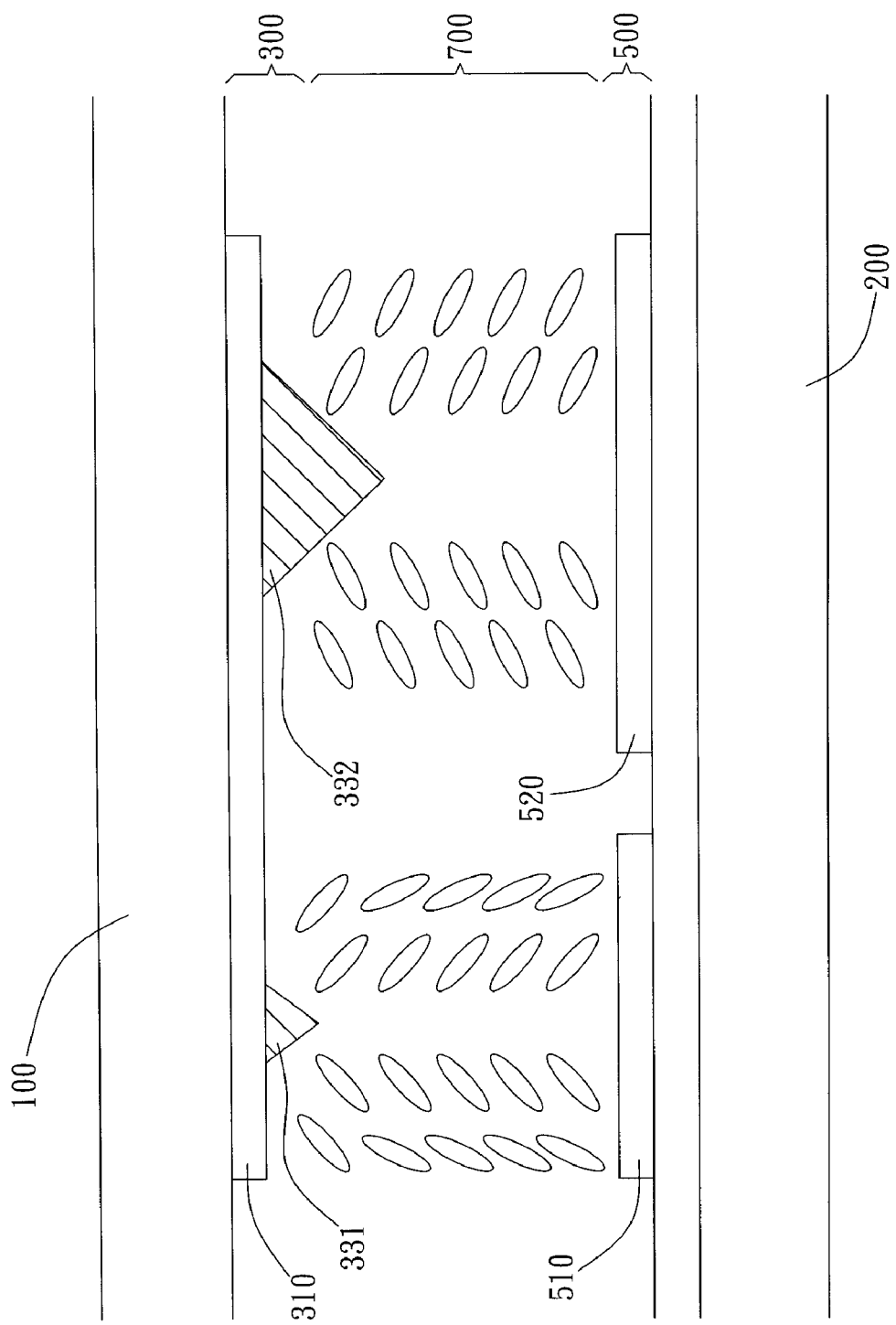
FIG. 2b shows a side view of the embodiment of the display panel.

In the embodiment shown in FIG. 2a and FIG. 2b, the display panel includes a first substrate 100, an alignment structure set 300, an upper electrode 310, a second substrate 200, a pixel electrode 500 and a liquid crystal layer 700. In the embodiment, the first substrate 100 is disposed on the displaying side of the display panel while the second substrate 200 is disposed on the non-displaying side of the display panel. The first substrate 100 is disposed opposite to the second substrate 200. The alignment structure set 300, the pixel electrode 500 and liquid crystal layer 700 are accommodated between both of these substrates. The first substrate 100 and the second substrate 200 are made of transparent material, for example, such as glass, transparent plastic and so on. However, in other embodiment of the reflective LCD panel, the second substrate 200 can be made of non-transparent material.

In the embodiment shown in FIG. 2b, the alignment structure set 300 includes a first alignment unit 331 and a second alignment unit 332. The upper electrode 310 is disposed on the first substrate 100. In this embodiment, the upper electrode 310 is distributed on the first substrate 100 and faces to the second substrate 200. The upper electrode 310 is preferably made of transparently conductive material such as ITO and so on. The first alignment unit 331 and the second alignment unit 332 are formed on the upper electrode 310, respectively. Besides, the first alignment unit 331 is distinct from the second alignment unit 332. For example, the first alignment unit 331 and the second alignment unit 332 are distinct among several factors, which include size, angle, structure, basic shape and so on. Furthermore, the first alignment unit 331 and the second alignment unit 332 may respectively have different contacting surface areas corresponding to the upper electrode 310, different cross-sectional areas and so on. In this embodiment, the first alignment unit 331 and the second alignment unit 332 protrude away from the upper electrode 310 and the first substrate 100 to form the first cone and the second cone, respectively. In the embodiment shown in FIG. 2b, the size of the first alignment unit 331 and the second alignment unit 332 are distinct. Besides, both of the basal areas of these cones corresponding to the upper electrode 310 are different.

In the embodiment shown in FIG. 2a and FIG. 2b, a pixel electrode 500 is formed on the second substrate 200. The pixel electrode 500 includes a first lower electrode 510 and a second lower electrode 520 which are connected in series. The first lower electrode 510 is disposed corresponding to the first alignment unit 331. In the embodiment shown in FIG. 2b, the first lower electrode 510 is disposed under the first alignment unit 331. The second lower electrode 520 is disposed corresponding to the second alignment unit 332. In the embodiment shown in FIG. 2b, the second lower electrode 520 is disposed under the second alignment unit 332. In this embodiment, the surface area of the first lower electrode 510 is smaller than the surface area of the second lower electrode 520. Besides, the basal area of the first alignment unit 331 connecting to the upper electrode 310 is smaller than the basal area of the second alignment unit 332 connecting the same. The pixel electrode preferably includes a transmissive electrode, which is made of transparently conductive material such as ITO and so on. However, in the embodiment of the reflective LCD panel and the transflective LCD panel, the pixel electrode 500 can be reflective electrode and be made of non-transparently conductive material including several kinds of metals such as aluminum, silver and so on. Moreover, the first lower electrode 510 and the second electrode 520 can be formed as transmissive electrode and reflective electrode, respectively.

Figure 2C:
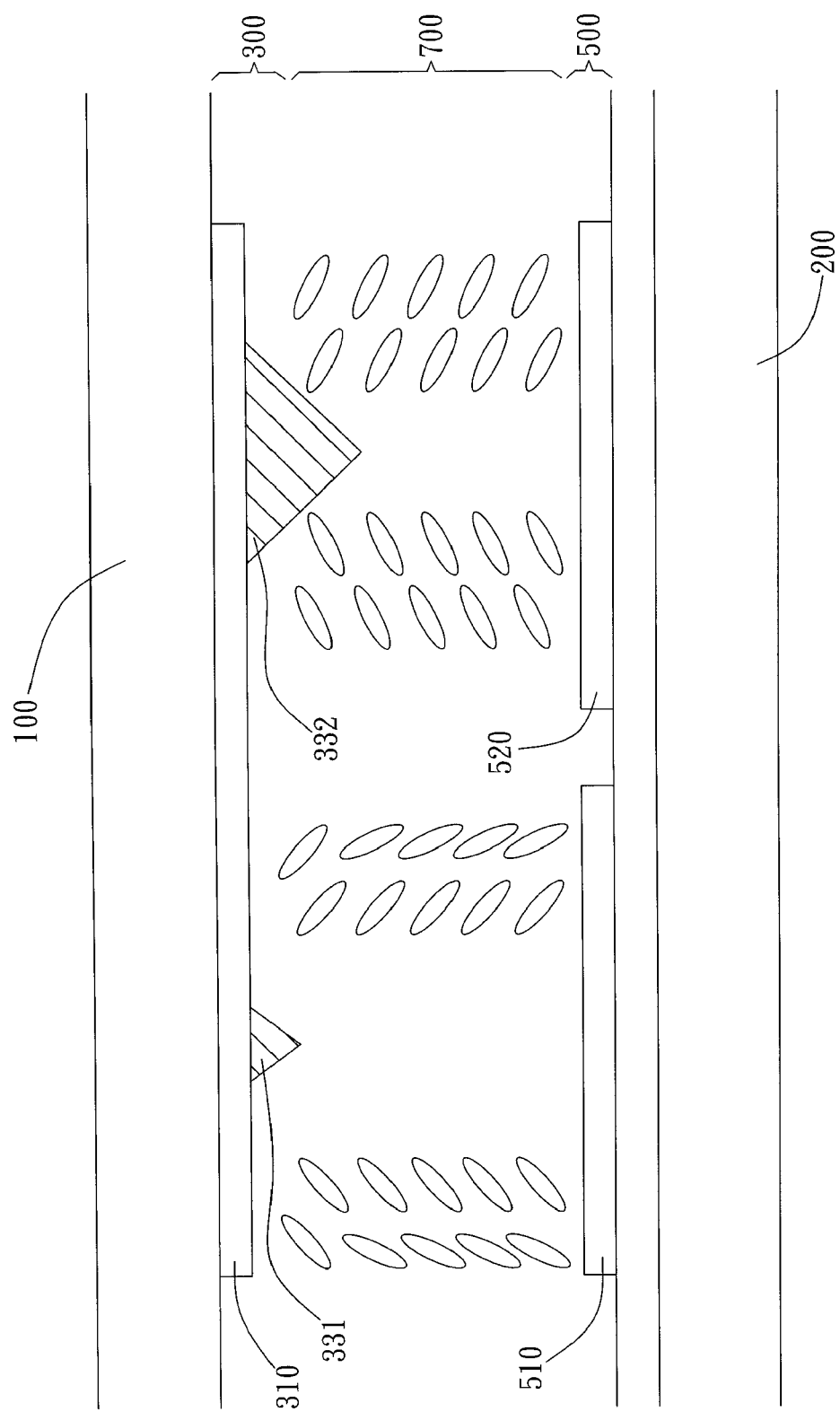
FIG. 2c shows a side view of another embodiment of display panel.

The liquid crystal layer 700 is accommodated between the upper electrode 310 and the pixel electrode 500. By regulating the potential difference between the upper electrode 310 and the pixel electrode 500, the conformation of the liquid crystal molecules in the liquid crystal layer 700 can be adjusted. In other words, the twisting angle of the liquid crystal molecules can be adjusted by modifying such potential difference. In the embodiment shown in FIG. 2b, because the surface areas of the first lower electrode 510 and the second lower electrode 520 in the pixel electrode 500 are different, the twisting angles of the liquid crystal molecules above the first lower electrode 510 and the second lower electrode 520 are different. Moreover, several different features such as structure, size and bevel angle between the first alignment unit 331 and the second alignment unit 332 would affect the conformation of these liquid crystal molecules. In the embodiment shown in FIG. 2c, by using the same surface areas of the first lower electrode 510 and the second lower electrode 520, the different features, such as different sizes, between the first alignment unit 331 and the second alignment unit 332 can generate different twisting angles.

In the embodiment shown in FIG. 2b, the surface area of the first lower electrode 510 is small than the surface area of the second lower electrode 520. Consequently, the first alignment unit 331 corresponding to the first lower electrode 510 could generate sufficient twisting-angle effect of the liquid crystal molecules above the first lower electrode 510, even if the basal area of the first alignment unit 331 is smaller than that of the second alignment unit 332. In this embodiment, because the first alignment unit 331 has the smaller basal area, the over-lapping area of the alignment unit on the first substrate 100 can be reduced. In other words, by using the first alignment unit 331 with smaller basal area, the aperture ratio of the whole system can increase and further augment luminosity and luminous efficiency. In the embodiment, the respective overlapping-area ranges of the first alignment unit 331 and the second alignment unit 332 to the first lower electrode 510 and the second lower electrode 520 are 5□ to 10□. However, the above-mentioned ranges can be adjusted depending on different design or demand. For example, the size of the first alignment unit 331 may be greater than that of the second alignment unit 332.

Figure 3:
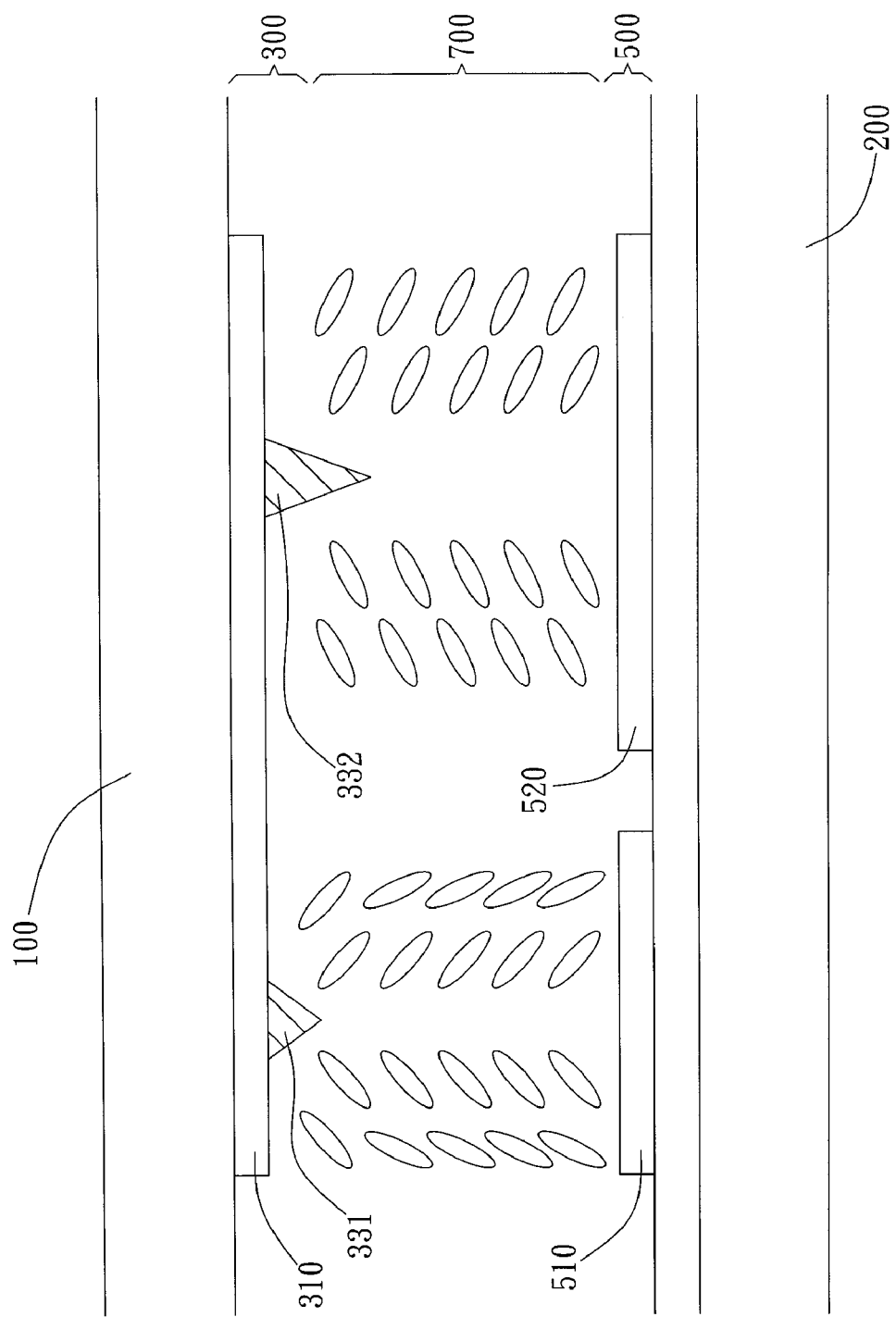
FIG. 3 shows a side view of another embodiment of the first alignment unit and the second alignment unit.

In the embodiment shown in FIG. 3, except for adjusting the basal areas and size (ex. volume) of the first alignment unit 331 and the second alignment unit 332, the conformation of liquid crystal molecules can be adjusted by changing the bevel angle formed between the cone surface and the surface of the upper electrode 310. Thus, the first alignment unit 331 and the second alignment unit 332 are different. In this embodiment, the first cone, i.e. the first alignment unit 331, has a smaller bevel angle corresponding to the first lower electrode 510 and has a smaller basal surface area. In other words, the bevel angle of the first alignment unit 331 corresponding to the upper electrode 310 is smaller than the bevel angle of the second alignment unit 332 corresponding to the second lower electrode 520. Besides, the bevel angle of the first alignment unit 331 can be reduced to shrink the basal area. Therefore, in the same alignment effect, this design obtains a larger aperture ratio.

In the embodiment shown in FIG. 3, the first cone and the second cone, i.e. the first alignment unit 331 and the second alignment unit 332, are preferably made of photo-resisting material and are formed on the upper electrode 310 by photo process and so on. The photo-resisting material includes transparent photo-resisting, gray photo-resisting and other types of photo-resisting material. However, in other embodiments, the first cone and the second cone can be formed by ink-jet process, deposition process, etching process and so on.

Figure 4:
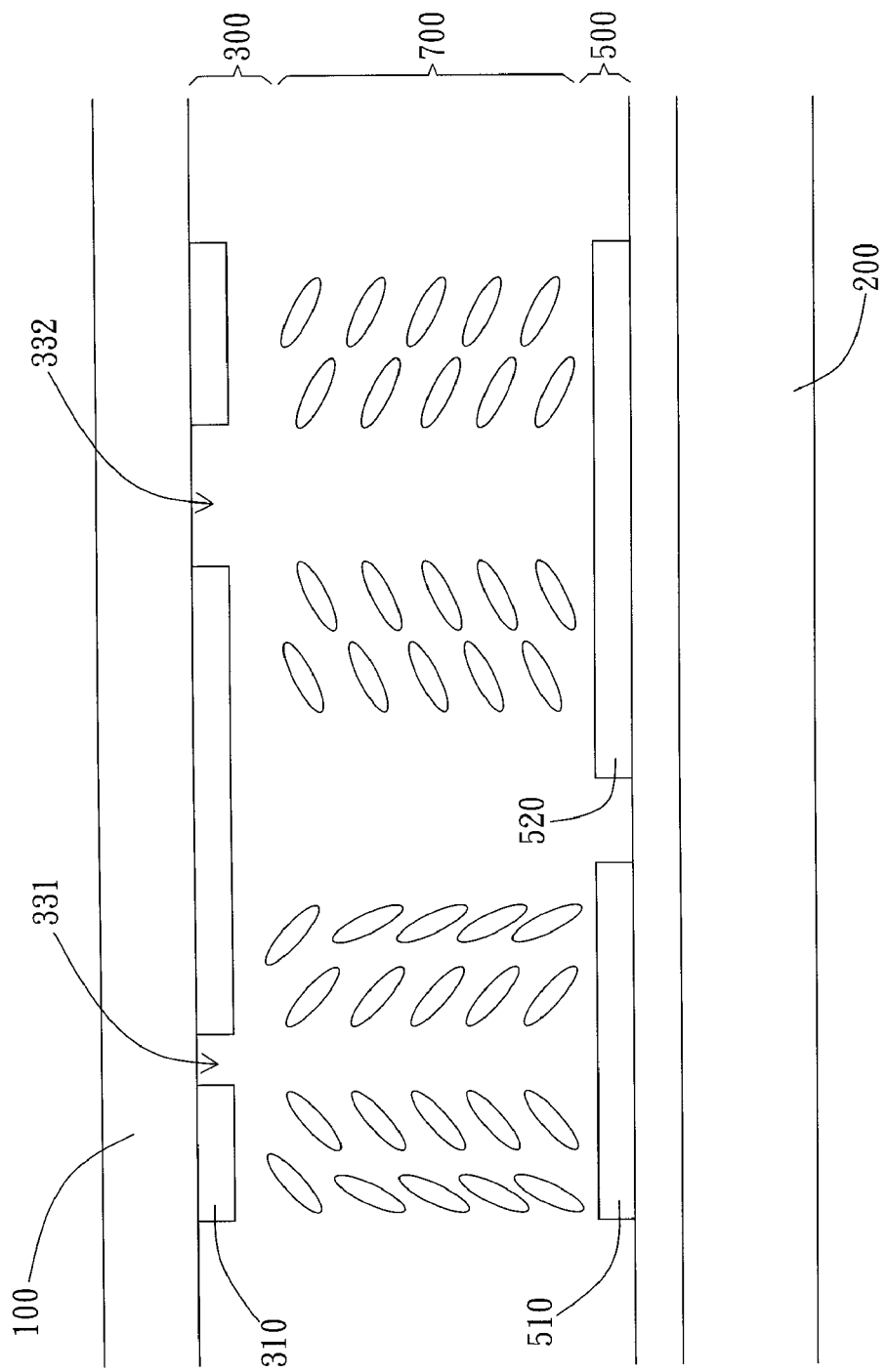
FIG. 4 shows a side view of the embodiment of the first alignment unit and the second alignment unit.

In the embodiment shown in FIG. 4, the first alignment unit 331 and the second alignment unit 332 can be formed on the upper electrode 310 as a first cavity and a second cavity, respectively. The first cavity and the second cavity penetrate the upper electrode 310, respectively. In the embodiment, the cross-sectional area of the first alignment unit/the first cavity 331 on the upper electrode 310 is smaller than the cross-sectional area of the second alignment unit/second cavity 332 on the upper electrode 310. In the embodiment shown in FIG. 4, the first alignment unit/the first cavity 331 with a smaller cross-sectional area is disposed corresponding to the first lower electrode 510 having a smaller surface area. Besides, the second alignment unit/the second cavity 332 is disposed corresponding to the second lower electrode 520 having a larger surface area. In other words, the size of the first alignment unit 331 is less than the size of the second alignment unit 332, but not limited thereto. The size of the first alignment unit 331 may be greater than the size of the second alignment unit 332. However, in other embodiments, when the cross-sectional area of the first alignment unit/the first cavity 331 is different from the cross-sectional area of the second alignment unit/second cavity 332, both of the alignment units 331, 332 can be disposed corresponding to the first lower electrode 510 and the second lower electrode 520 having the same surface area, respectively.

Figure 5:
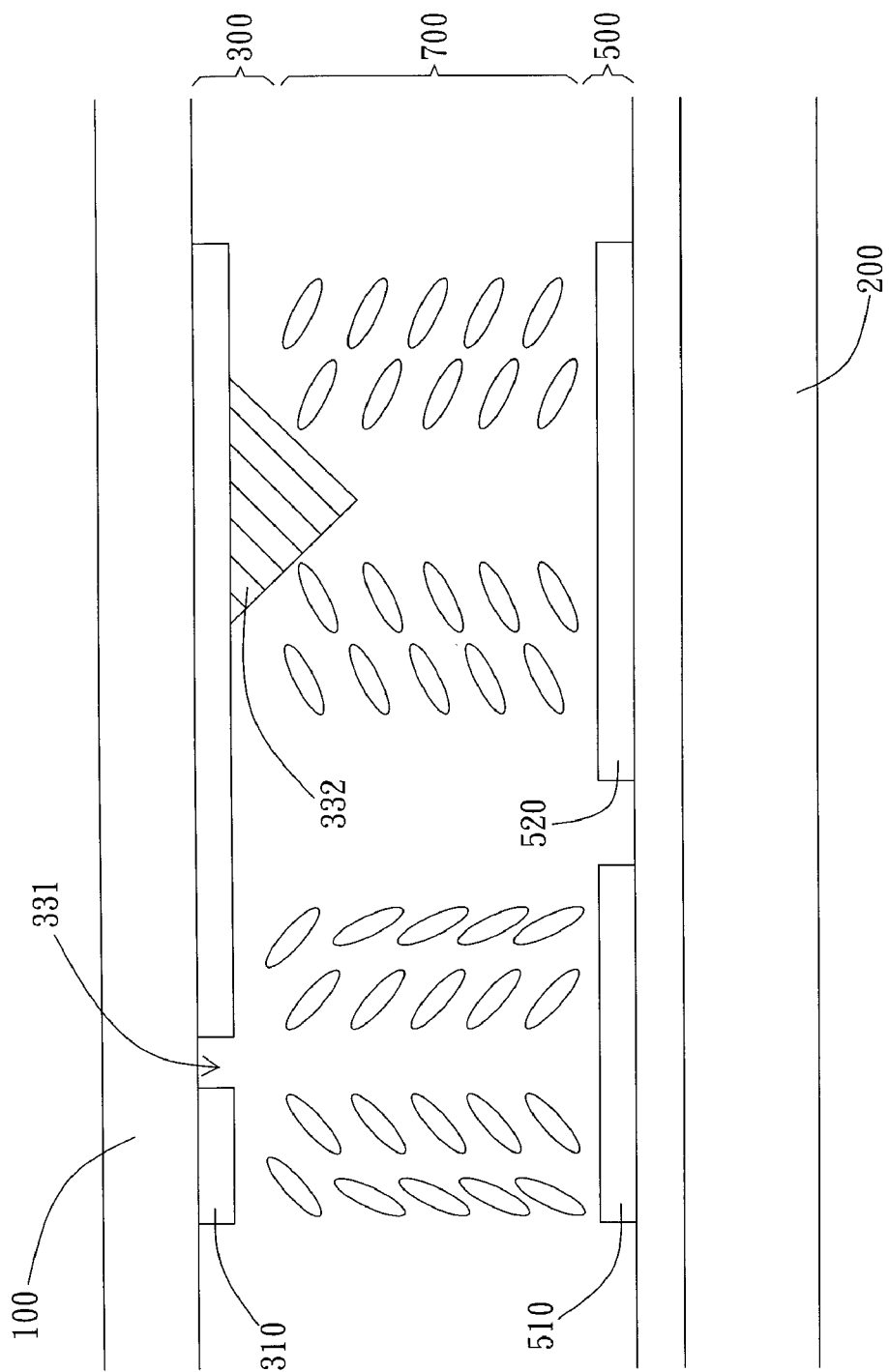
FIG. 5 shows a side view of another embodiment of the first alignment unit and the second alignment unit.

It is possible for the first alignment unit 331 and the second alignment unit 332 having distinct structures. In the embodiment shown in FIG. 5, the first alignment unit 331 is a cavity formed on the upper electrode 310, while the second alignment unit 332 is a cone formed on the upper electrode 310. However, in other embodiments, the cone can be formed as the first alignment unit 331, while the second alignment unit 332 is formed as a cavity. In the embodiment shown in FIG. 5, the cross-sectional area of the first alignment unit 331 on the upper electrode 310 is smaller than the cross-sectional area of the second alignment unit 332 on the upper electrode 310. However, except for the different cross-sectional areas, the conformation of the liquid crystal molecules can be adjusted by affecting the bevel angles of the first alignment unit 331 and the second alignment unit 332 or other method providing the same function.

Figure 6C:
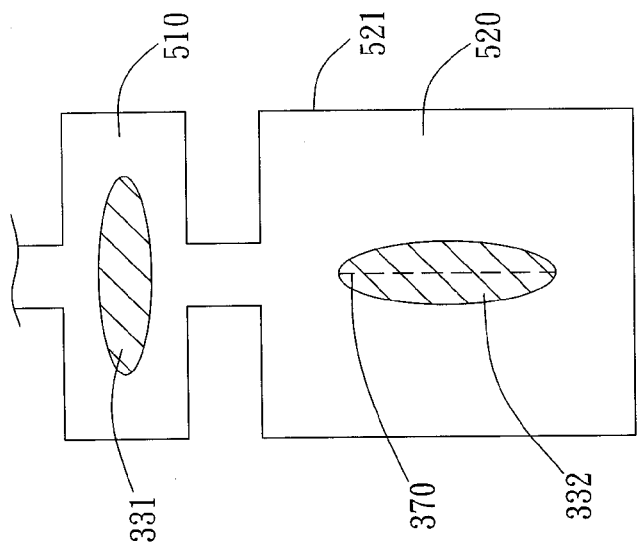
FIG. 6b and 6c show a top view of another embodiment of the first alignment unit and the second alignment unit.
Figure 6B:
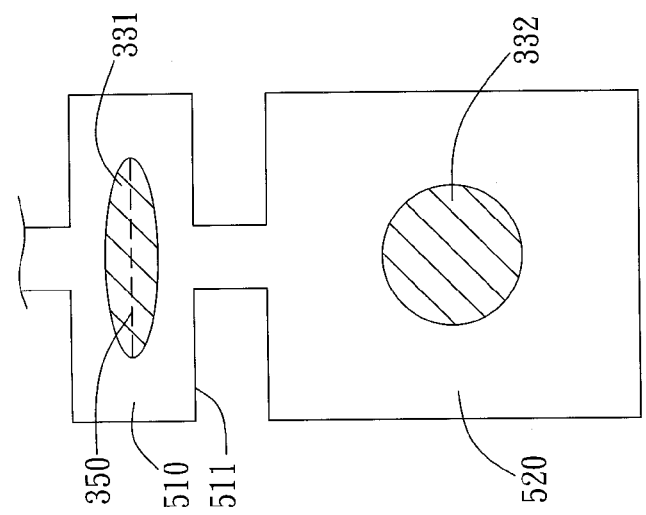
Figure 6A:
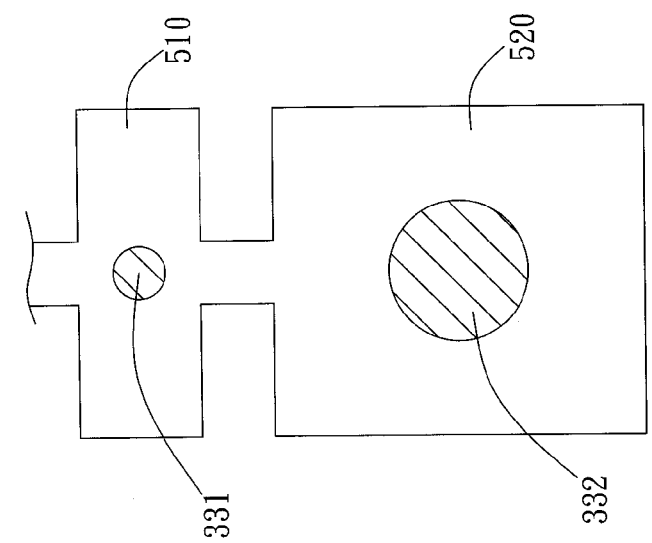
FIG. 6a shows a top view of the embodiment of the first alignment unit and the second alignment unit.

In the embodiment shown in FIG. 6a, no matter what kinds of shapes these alignment units will be, the first alignment unit 331 and the second alignment unit 332 on the upper electrode 310 are preferably shaped in the circular cross-section. Besides, both of the alignment units 331, 332 are disposed above the first lower electrode 510 and the second lower electrode 520, respectively. When the first alignment unit 331 and the second alignment unit 332 are cones, the cross-sectional shapes are identical to the shapes of the basal areas. When the first alignment unit 331 and the second alignment unit 332 are cavities, the opening shapes and the basal shapes are identical to the aperture shapes of these cavities. In the embodiment, the circular cross-sectional area of the first alignment unit 331 is smaller than the circular cross-sectional area of the second alignment unit 332.

In other embodiments, the cross-sectional shape of the first alignment unit 331 and the second alignment unit 332 on the upper electrode 310 can be respectively shaped in oval or other shapes. In the embodiment shown in FIG. 6b, the cross-sectional shape of the first alignment unit 331 on the upper electrode 310 is shaped in near-oval. Besides, the longitudinal axle 350 of the near-oval shape is preferably parallel to the longitudinal side 511 of the first lower electrode 510. By this design, the horizontal distance between each side of the first lower electrode 510 and the first alignment unit 331 will have little discrepancy. In the embodiment shown in FIG. 6b, the direction of the longitudinal axle 350 is perpendicular to the connecting direction between the first alignment unit 331 and the second alignment unit 332.

In another embodiment of the second alignment unit 332 shown in FIG. 6c, the cross-sectional shape of the second alignment unit 332 on the upper electrode 310 can be shaped in near-oval or circular. The longer axle 370 of the near-oval shape is preferably parallel to the longer side 521 of the second lower electrode 520. By this design, the horizontal distance between each side of the second lower electrode 520 and the second alignment unit 332 will have little discrepancy. In this embodiment shown in FIG. 6c, the direction of the longer axle 370 is parallel to the connecting direction between the first alignment unit 331 and the second alignment unit 332.

Figure 7:
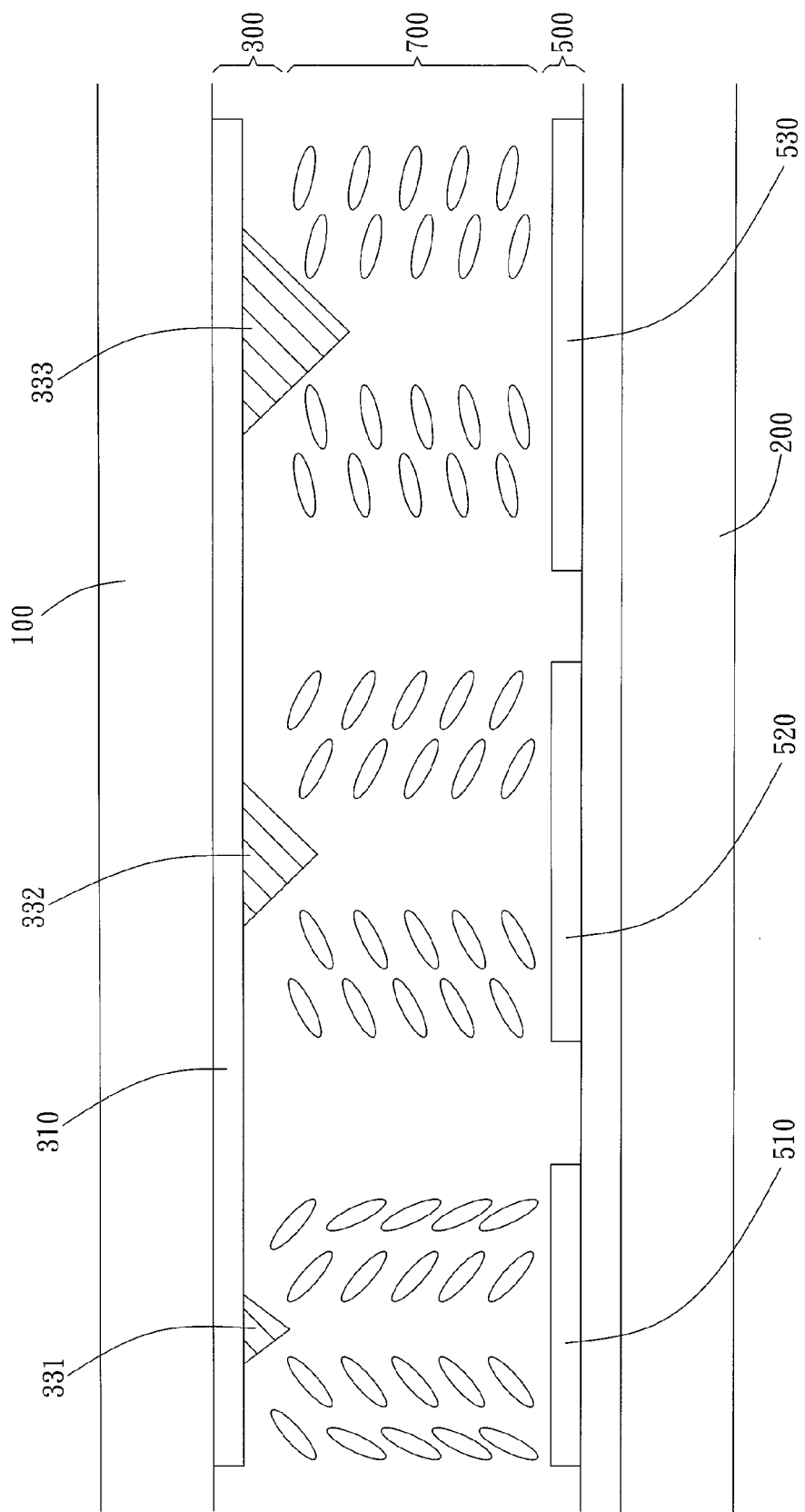
FIG. 7 shows a side view of the embodiment including the third alignment unit.

In the embodiment shown in FIG. 7, the alignment structure set 300 further includes a third alignment unit 333. The pixel electrode 500 includes a third lower electrode 530. The third alignment unit 333 is preferably disposed for connecting with the first alignment unit 331 and the second alignment unit 332 in series. Besides, the third lower electrode 530 electrically connects with the first lower electrode 510 and the second lower electrode 520 in series. The third alignment unit 333 and the second alignment unit 332 are different. For example, both of the alignment units are distinct among several factors, which include size, angle, structure, basic shape and so on. Furthermore, the third alignment unit 333 and the second alignment unit 332 may respectively have different contacting surface areas corresponding to the upper electrode 310, different cross-sectional areas and so on.

In the embodiment, the third alignment unit 333 and the second alignment unit 332 are formed as cones which protrude away from the upper electrode 310 and the first substrate 100. In the embodiment shown in FIG. 7, the volumes of the third alignment unit 333 and the second alignment unit 332 are different. Besides, the basal areas between both of the alignment units and upper electrode 310 are different. Moreover, in another embodiment, except for cones, the third alignment unit 333 could be formed as a cavity on the upper electrode 310. In the embodiment shown in FIG. 7, the cross-sectional shape of the third alignment unit 333 on the upper electrode 310 is shaped in near-oval. The direction of the longitudinal axle of the third alignment unit is perpendicular to the direction of the longitudinal axle of the first alignment unit 331. However, in other embodiments, the cross-sectional shape of the third alignment unit 333 on the upper electrode 310 is shaped in circular or other shapes.

In the embodiment shown in FIG. 7, the third alignment unit 530 is disposed under the third alignment unit 333. In the embodiment, the preferred surface area of the third lower electrode 530 is larger than the surface area of the second lower electrode 520. By this design, the twisting angles of the liquid crystal molecules above the first lower electrode 510, the second lower electrode 520 and the third lower electrode 530 can be different. However, in other embodiment, through using the same surface areas of the second lower electrode 520 and the third lower electrode 530, the twisting angles can be adjusted by different third alignment unit 333. In the embodiment, the respective overlapping-area ranges of the third alignment unit 333 to the third lower electrode 530 are 5☐ to 10☐. However, the ranges can be adjusted depending on different design and demand.

Figure 8:
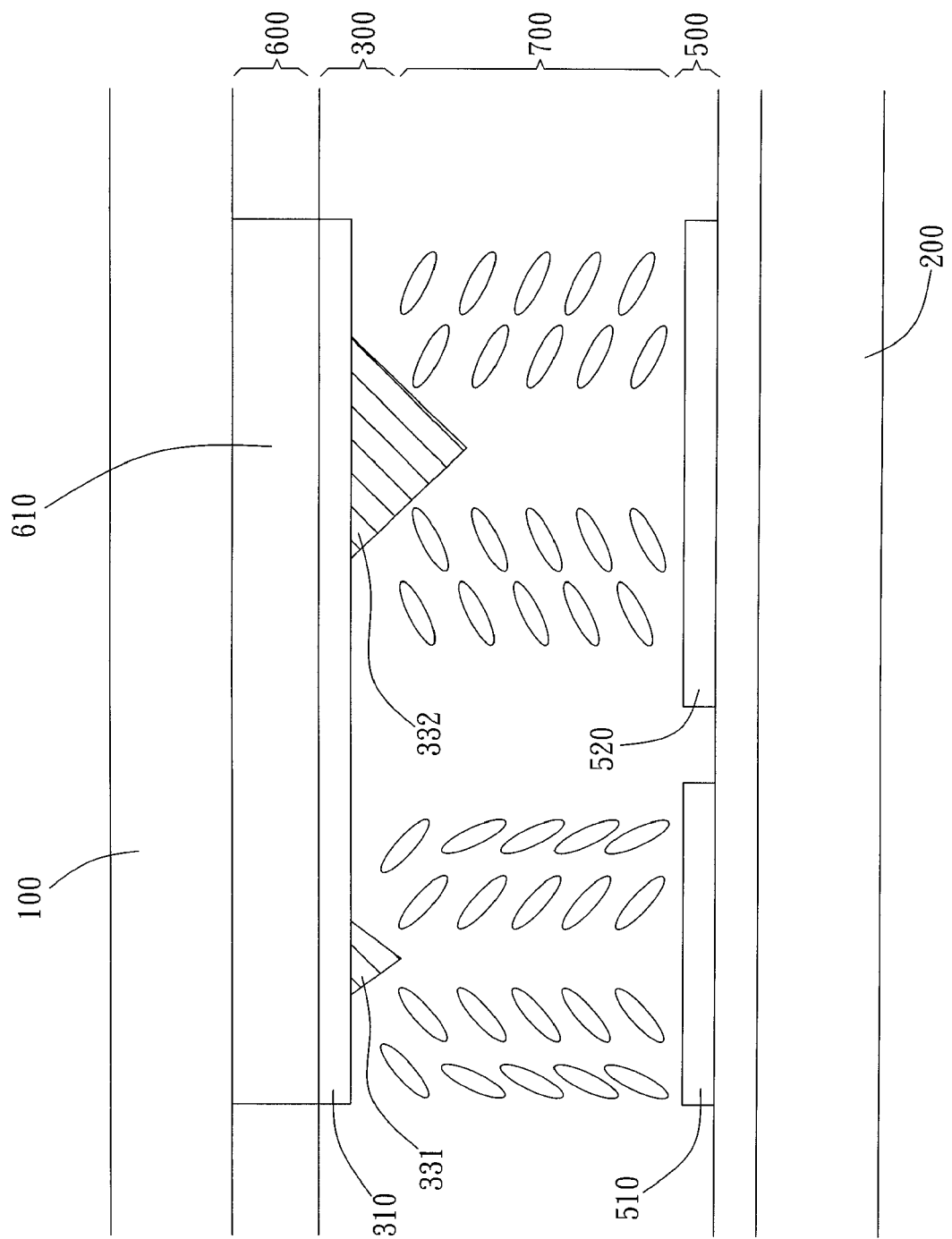
FIG. 8 shows a side view of the embodiment including color filter substrate.

In the embodiment shown in FIG. 8, a color filter layer 600 is disposed on the first substrate 100 to form the first substrate 100 as a color filter substrate. The color filter layer 600 is preferably formed by coating process, etching process or other processes providing the same function. The color filter layer 600 is accommodated between the first substrate 100 and the alignment structure set 300 and has at least a color unit 610. The color unit 610 is disposed corresponding to the first alignment unit 331 and the second alignment unit 332, when the color unit 610 is disposed corresponding to the first lower electrode 510 and the second lower electrode 520. In this embodiment, the color filter layer 600 preferably includes color units 310 having different colors. The colors of the color units 610 preferably include red, green, blue, white or other colors. When light from the liquid crystal layer 700 enters the color filter layer 600, the color units 610 can filter partial light to allow certain light within specific wave length to penetrate.

Figure 9:
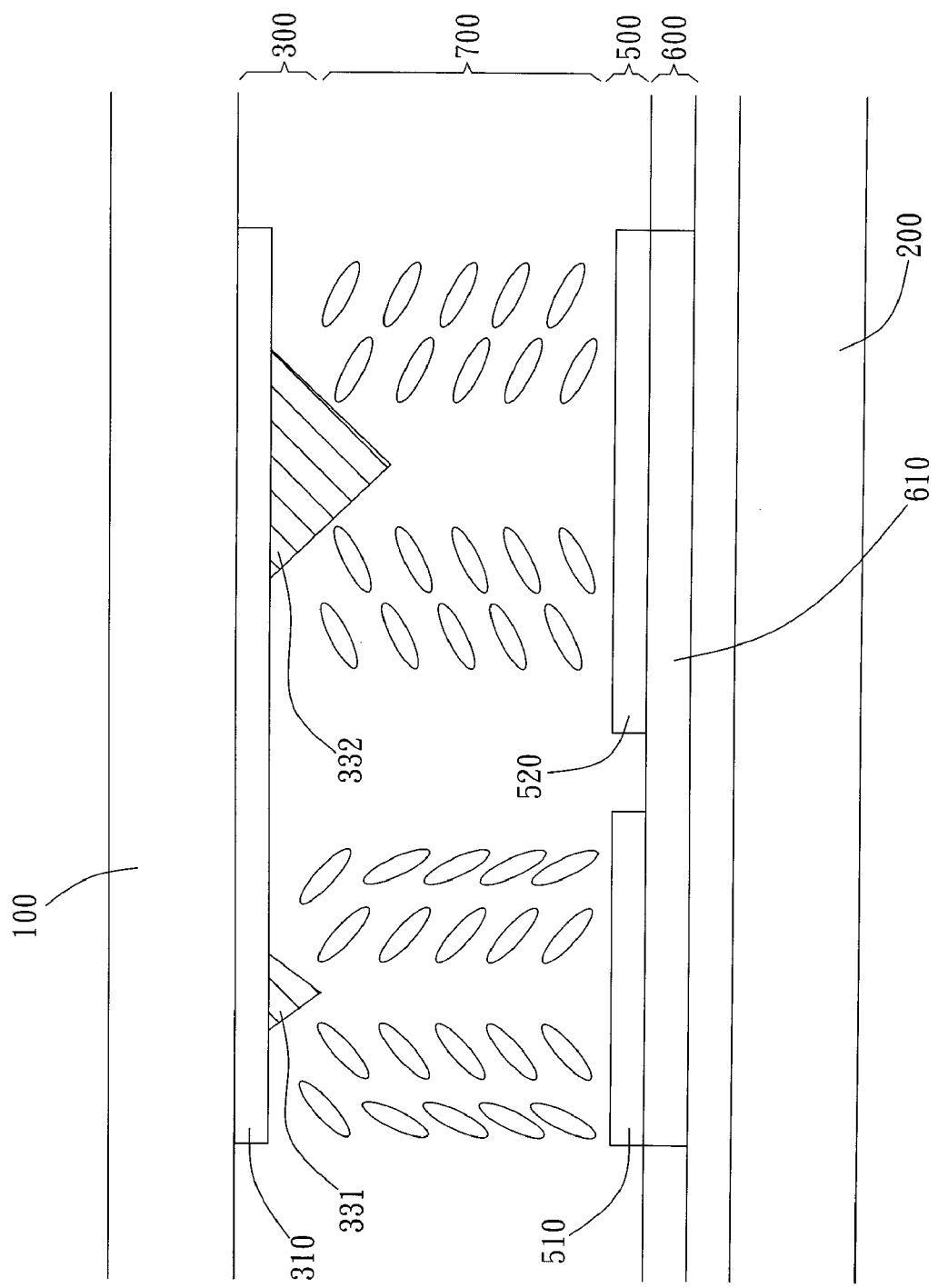
FIG. 9 shows a side view of the embodiment of color filter layer disposition.
Figure 10:
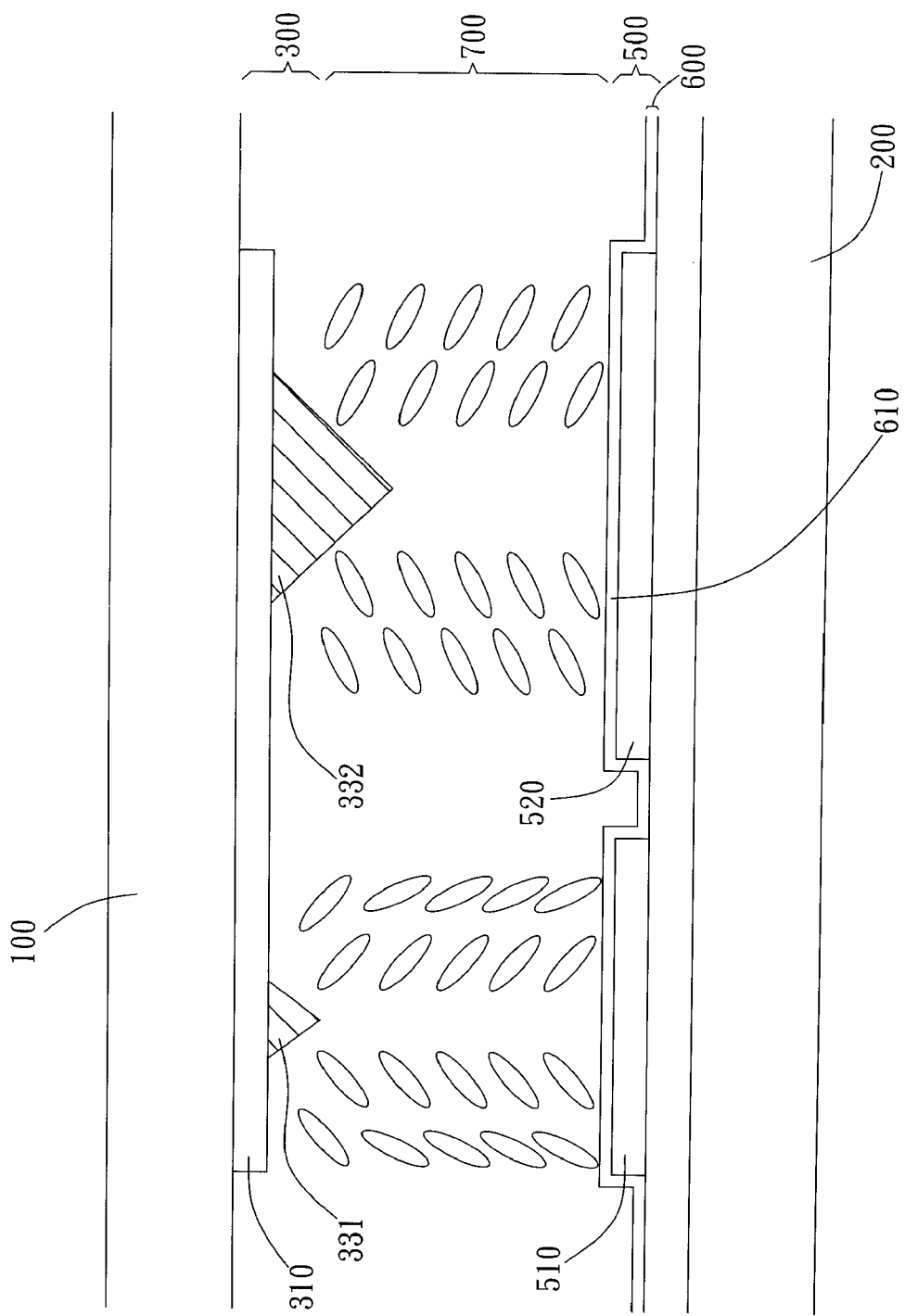
FIG. 10 shows a side view of the embodiment of color filter layer disposed on the pixel electrode.

In another embodiment of the color filter layer 600 shown in FIG. 9, the color filter layer 600 is accommodated between the second substrate 200 and the pixel electrode 500 to filter light before the light arrives the liquid crystal layer 700. The color unit 610 is disposed under the first lower electrode 510 and the second lower electrode 520 corresponding to the first alignment unit 331 and the second alignment unit 332. In the embodiment shown in FIG. 10, the color filter layer 600 can be formed on the pixel electrode 500 to accommodate the pixel electrode 500 between the color filter layer 600 and the second substrate 200. The color unit 610 is formed on the first lower electrode 510 and the second lower electrode 520 corresponding to the first alignment unit 331 and the second alignment unit 332, respectively. In the meantime, liquid crystal layer 700 is accommodated between the lower electrodes and the alignment units.

In the above-mentioned embodiments, the alignment structure surface and the surface of the pixel electrode are the surfaces which face to the liquid crystal layer. An alignment film is preferably disposed on these surfaces. The material of the alignment film includes polyimide resin for controlling the of liquid crystal alignment.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A color filter substrate, comprising:
   a substrate;
   a color filter layer disposed on the substrate, wherein the color filter layer has at least one color unit; and
   an alignment structure set including:
      an upper electrode disposed on the color filter layer; and
      a first alignment unit, a second alignment unit, and a third alignment unit, formed on the upper electrode and corresponding to at least one color unit, wherein the first alignment unit, the second alignment unit and the third alignment unit are distinct, the first alignment unit includes a first cone disposed on the upper electrode, the first cone is away from the color filter layer, and a basal shape of the first cone is shaped in near-oval or circular.

2. The color filter substrate of claim 1, wherein the second alignment unit includes a second cone disposed on the upper electrode, and the second cone is away from the color filter layer, a basal area of the first cone is less than a basal area of the second cone, and a basal shape of the second cone is shaped in near-oval or circular.

3. The color filter substrate of claim 1, wherein the second alignment unit includes a second cone disposed on the upper electrode, and the second cone is away from the color filter layer, and an bevel angle formed between a surface of the first cone and a surface of the upper electrode is less than an bevel angle formed between a surface of the second cone and a surface of the upper electrode.

4. The color filter substrate of claim 1, wherein a size of the first alignment unit is less than a size of the second alignment unit.

5. The color filter substrate of claim 1, wherein the second alignment unit and the third alignment unit are shaped in cone.

6. A color filter substrate, comprising:
   a substrate;
   a color filter layer disposed on the substrate, wherein the color filter layer has at least one color unit; and
   an alignment structure set including:
      an upper electrode disposed on the color filter layer; and
      a first alignment unit, a second alignment unit, and a third alignment unit, formed on the upper electrode and corresponding to the at least one color unit, wherein the first alignment unit is distinct from the second alignment unit, and the third alignment unit and the first alignment unit are distinct; the first alignment unit includes a first cavity, and the second alignment unit and the third alignment unit are shaped in cone.

7. The color filter substrate of claim 6, wherein an opening shape and a basal shape of the first cavity is shaped in near-oval or circular.

8. The color filter substrate of claim 6, wherein the second alignment unit includes a second cavity formed on the upper electrode, and the cross-sectional area of the first cavity on the upper electrode is less than the cross-sectional area of the second cavity on the same.

9. The color filter substrate of claim 8, wherein an opening shape and a basal shape of the second cavity on the upper electrode is shaped in near-oval or circular.

10. The color filter substrate of claim 6, wherein the second alignment units includes a cone formed on the upper electrode, the cone is disposed on the upper electrode and protrudes away from the color filter layer.

11. The color filter substrate of claim 6, wherein a size of the first alignment unit is less than a size of the second alignment unit.

12. A color filter substrate, comprising:
a substrate;
a color filter layer disposed on the substrate, wherein the color filter layer has at least one color unit; and
an alignment structure set including:
an upper electrode disposed on the color filter layer; and
a first alignment unit, a second alignment unit, and a third alignment unit, formed on the upper electrode and corresponding to the at least one color unit, wherein the first alignment unit, the second alignment unit, and the third alignment unit are distinct; the first alignment unit includes a first cavity.

13. A display panel, comprising:
a first substrate;
an alignment structure set including:
an upper electrode, disposed on the first substrate; and
a first alignment unit, a second alignment unit, and a third alignment unit, all formed on the upper electrode, wherein the first alignment unit is distinct from the second alignment unit, and the third alignment unit is distinct from the first alignment unit, wherein the first alignment unit includes a first cone, disposed on the upper electrode and protruding away from the first substrate, and wherein a basal shape of the first cone is shaped in near-oval, a longitudinal axle of the near-oval shape is parallel to a longitudinal side of the first lower electrode;
a second substrate;
a pixel electrode formed on the second substrate, wherein the pixel electrode has a first lower electrode, a second lower electrode, and a third lower electrode, the first lower electrode, the second lower electrode, and the third lower electrode are respectively disposed in opposition to the first alignment unit, the second alignment unit, and the third alignment unit, and a surface area of the first lower electrode is different from a surface area of the second lower electrode; and
a liquid crystal layer, disposed between the upper electrode and the pixel electrode.

14. The display panel of claim 13, wherein the second alignment unit includes a second cone disposed on the upper electrode and protruding away from a color filter layer, and an bevel angle formed between a surface of the first cone and a surface of the upper electrode is less than an bevel angle formed between a surface of the second cone and a surface of the upper electrode.

15. The display panel of claim 13, wherein a size of the first alignment unit is less than that of the second alignment unit, and a surface area of the first lower electrode is less than that of the second lower electrode.

16. A display panel, comprising:
a first substrate;
an alignment structure set including:
an upper electrode, disposed on the first substrate; and
a first alignment unit, a second alignment unit, and a third alignment unit, all formed on the upper electrode, wherein the first alignment unit is distinct from the second alignment unit, and the third alignment unit is distinct from the first alignment unit, wherein the first alignment unit includes a first cone, disposed on the upper electrode and protruding away from the first substrate;
a second substrate;
a pixel electrode formed on the second substrate, wherein the pixel electrode has a first lower electrode, a second lower electrode, and a third lower electrode, the first lower electrode, the second lower electrode, and the third lower electrode are respectively disposed in opposition to the first alignment unit, the second alignment unit, and the third alignment unit, and a surface area of the first lower electrode is different from a surface area of the second lower electrode; and
a liquid crystal layer, disposed between the upper electrode and the pixel electrode, wherein the second alignment unit includes a second cone, disposed on the upper electrode and protruding away from a color filter layer, the basal area of the first cone is less than the basal area of the second cone, a basal shape of the second cone is shaped in near-oval, and a longitudinal axle of the near-oval shape is parallel to a longitudinal side of the second lower electrode.

17. A display panel, comprising:
a first substrate;
an alignment structure set including:
an upper electrode, disposed on the first substrate; and
a first alignment unit, a second alignment unit, and a third alignment unit, all formed on the upper electrode, wherein the first alignment unit is distinct from the second alignment unit, and the third alignment unit is distinct from the first alignment unit;
a second substrate;
a pixel electrode formed on the second substrate, wherein the pixel electrode has a first lower electrode, a second lower electrode, and a third lower electrode, the first lower electrode, the second lower electrode, and the third lower electrode are respectively disposed in opposition to the first alignment unit, the second alignment unit, and the third alignment unit, and a surface area of the first lower electrode is different from a surface area of the second lower electrode, wherein a size of the first alignment unit is greater than that of the second alignment unit, and a surface area of the first lower electrode is less than that of the second lower electrode; and
a liquid crystal layer, disposed between the upper electrode and the pixel electrode.

* * * * *